United States Patent
Block et al.

(10) Patent No.: US 9,789,390 B1
(45) Date of Patent: Oct. 17, 2017

(54) VIDEO GAME CONTROL ATTACHMENT

(71) Applicant: Performance Designed Products LLC, Sherman Oaks, CA (US)

(72) Inventors: Gerard Lambert Block, West Hollywood, CA (US); Eric B. Fulghum, South Pasadena, CA (US)

(73) Assignee: Performance Designed Products LLC, Burbank, CA (US)

( * ) Notice: Subject to any disclaimer, the term of this patent is extended or adjusted under 35 U.S.C. 154(b) by 592 days.

(21) Appl. No.: 13/848,050

(22) Filed: Mar. 20, 2013

Related U.S. Application Data (60) Provisional application No. 61/613,393, filed on Mar. 20, 2012.

(51) Int. Cl.
  *A63F 13/00* (2014.01)
  *A63F 13/20* (2014.01)
(52) U.S. Cl.
  CPC .................................... *A63F 13/06* (2013.01)
(58) Field of Classification Search
  CPC ............................. A63F 13/2145; A63F 13/06
  USPC ...................................................... 463/36, 37
  See application file for complete search history.

(56) References Cited

U.S. PATENT DOCUMENTS

| | | | |
|---|---|---|---|
| 2002/0136214 A1* | 9/2002 | Do | G06Q 20/4014 370/392 |
| 2002/0195771 A1* | 12/2002 | Ku | A63F 13/02 273/148 B |
| 2010/0081505 A1* | 4/2010 | Alten | A63F 13/95 463/36 |
| 2013/0159928 A1* | 6/2013 | Joynes | G06F 3/04817 715/810 |

* cited by examiner

*Primary Examiner* — David L Lewis
*Assistant Examiner* — Eric M Thomas
(74) *Attorney, Agent, or Firm* — Sheppard Mullin; Daniel Yannuzzi; Jonathon Marina (57) ABSTRACT

According to various embodiments, an input device attachment is provided and, more specifically, for some embodiments an input device attachment is provided that is combinable with a computer or video game controller. For example, various embodiments provide attachments for handheld video gaming devices configured to control electronic devices, such handheld video gaming devices including without limitation computer controllers, video game console controllers, and handheld video gaming devices. Various embodiments of the invention comprise an attachment comprising an input mechanism that may augment an existing input mechanism of an input device or add an additional input mechanism to the input device. Additionally, some embodiments may augment an exterior structure, or a surface of the input device.

18 Claims, 6 Drawing Sheets

VIDEO GAME CONTROL ATTACHMENT

CROSS-REFERENCE TO RELATED APPLICATION

This application claims the benefit of U.S. Provisional Application Ser. No. 61/613,393, entitled "VIDEO GAME CONTROL ATTACHMENT," filed Mar. 20, 2012, which is hereby incorporated herein by reference.

FIELD OF THE INVENTION(S)

The present invention(s) relate to game controllers, and more particularly, some embodiments relate to attachments for computer or video game controllers.

DESCRIPTION OF THE RELATED ART

The use of specially configured and customized human input devices, such as video game controllers, keyboards, mice, and trackpads, have a history of use in controlling various devices in many industries. Generally, human input devices (hereafter, simply referred to as "input devices") are configured or customized to meet the needs or preferences of an individual user, often with respect to particular context, application or environment of use. Input devices typically include one or more input mechanisms adapted to receive an input (e.g., physical input) from a user and to translate the input into a corresponding output that may be electrical or mechanical in nature. For instance, an electronic input device, such as a digital handheld controller that is coupled to a processor-based system may receive a physical input from a user (e.g., via an input mechanism) and translate the physical input into a corresponding electrical signal readable by the digital input device.

In the realm of video game consoles (e.g., handheld or other video game consoles) and other video game processor-based systems (e.g., PDAs, laptops, smartphones, etc.), specially configured or customized input devices may include handheld game controllers (e.g., motion-enabled and otherwise), joysticks, analog sticks, digital sticks, directional pads, steering wheels, musical instrument controllers, pads (e.g., dance pads), and the like.

Modern interactive software programs, such as video games and the like, typically allow the user (e.g., a player of a video game) to provide some form of input through a handheld controller having such input features as buttons, analog joysticks, D-pad directional controls, trackpads, touch-sensitive screens, and other user input mechanisms that provide a means for a gamer (i.e. video game player) to input desired control commands to the video game software. In turn, the inputted control commands would typically affect the game activity on the video screen. A typical controller, such as one for a Sony® PlayStation®, Microsoft® XBOX®, XBOX 360®, or Nintendo® Wii® gaming console, is typically connected to the gaming console through a wire or wirelessly and comprises multiple buttons (for example X, O, Δ, or X, A, B, Y buttons, trigger buttons) and directional inputs (e.g., analog joysticks, four-way D-Pads). Likewise, handheld and mobile gaming systems, such as the Nintendo® DS™, Nintendo DS Lite™, Sony® PSP®, and Sony® Playstation® Vita have similar such controllers built-in, having buttons (e.g., X, O, Δ, or X, A, B, Y buttons) and directional inputs (e.g., D-Pads) that are usually integrated into the chassis of the system for purposes of size and mobility. Such buttons and directional inputs on the Nintendo® DS™ and Sony® Playstation® Vita (and other similar handheld video game systems) constitute types of video game controllers.

In some situations, it would be preferable and less expensive if an existing input device, such as a standard video game controller, could be reconfigured to be more suitable for the type of game being played, or reconfigured to meet the preferences of the user operating the controller. For example, a user may wish to specially configure or customize the input device to include user preferences relating to ergonomics of the input device, aesthetics of the input device, assignment of buttons or input mechanisms, and the specific application (e.g., first-person shooter video game) with which the input device is being used.

BRIEF SUMMARY OF EMBODIMENTS

According to various embodiments, an input device attachment is provided and, more specifically, for some embodiments an input device attachment is provided that is combinable with a computer or video game controller.

Various embodiments provide attachments for input devices configured to control electronic devices, such input devices including without limitation computer controllers, video game console controllers, and handheld video gaming devices (e.g., handheld video game consoles, or video game-enabled mobile devices). Various embodiments of the invention comprise an attachment comprising an input mechanism that may augment an existing input mechanism of an input device or add an additional input mechanism to the input device. Additionally, some embodiments may augment an exterior structure, or a surface of the input device (e.g., add grips to the controller or device, or adapting the contour of the controller or device to a user's hands).

Other features and aspects of the invention(s) will become apparent from the following detailed description, taken in conjunction with the accompanying drawings, which illustrate, by way of example, the features in accordance with embodiments of the invention. The summary is not intended to limit the scope of embodiments of the invention(s), which are defined solely by the claims attached hereto.

BRIEF DESCRIPTION OF THE DRAWINGS

The embodiments of the invention(s) are described in detail with reference to the following figures. The drawings are provided for purposes of illustration only and merely depict typical or example embodiments of the invention(s). These drawings are provided to facilitate the reader's understanding of the invention(s) and shall not be considered limiting of the breadth, scope, or applicability of the invention(s). It should be noted that for clarity and ease of illustration these drawings are not necessarily made to scale.

Some of the figures included herein illustrate various embodiments of the invention(S) from different viewing angles. Although the accompanying descriptive text may refer to such views as "top," "bottom" or "side" views, such references are merely descriptive and do not imply or require that embodiments be implemented or used in a particular spatial orientation unless explicitly stated otherwise.

The figures are not intended to be exhaustive or to limit embodiments to the precise form disclosed. It should be understood that embodiments can be practiced with modification and alteration, and that embodiments be limited only by the claims and the equivalents thereof.

DETAILED DESCRIPTION

Various embodiments provide attachments for input devices configured to control electronic devices, such as computer controllers, video game console controllers, handheld video gaming devices (e.g., handheld video game consoles, or video game-enabled mobile devices), and the like. For example, various embodiments comprise an attachment comprising an input mechanism that may augment an existing input mechanism of a handheld video gaming device or add an additional input mechanism to the handheld video gaming device. Additionally, some embodiments may augment an exterior structure, or a surface of the handheld video gaming device (e.g., add grips to the controller or device, or adapting the contour of the controller or device to a user's hands).

With use of some embodiments, a handheld video gaming device may enable, enhance, or assist in a user's control of the handheld video gaming device for a particular purpose or a specific application. For example, some embodiments may enhance or adapt a video game controller or a handheld video gaming device for playing a particular game type (e.g., driving simulator, first-person-shooter) or a specific video game title (e.g., Call of Duty® by Activision Publishing, Inc.). Certain embodiments may enhance a video game controller or device by adding a trigger to a video game controller or a handheld video gaming device, where the trigger when depressed translates to an input action to an input mechanism of the video game controller or handheld video gaming device. As described herein, the translation may be facilitated by a translation mechanism.

In various embodiments, the attachment comprises a structure that may function as a cover to the handheld video gaming device, or as an exoskeleton that covers and protects the handheld video gaming device, once the attachment is coupled to the handheld video gaming device. Depending on the embodiment, once the attachment is coupled to the handheld video gaming device, the attachment may cover some or all of the exterior surface or the input mechanisms of the handheld video gaming device.

In some embodiments, the attachment comprises a receiving feature configured to receive the handheld video gaming device for coupling the attachment to the handheld video gaming device. For example, the receiving feature may comprise an opening or a recess in the attachment configured to receive the body of a handheld video gaming device, a structural feature of the handheld video gaming device, or an input mechanism of the handheld video gaming device. In particular, the receiving feature may correspond to a contour of the body of the handheld gaming device, an exterior surface of the handheld video gaming device, or a contour of an input mechanism of the handheld video gaming device.

In various embodiments, the attachment may comprise a coupling mechanism that facilitates coupling of the attachment to the handheld video gaming device. Example coupling mechanisms may include, without limitation, latches, clips, tabs, and fasteners.

According to some embodiments, the attachment may comprise a flexible or semi-flexible structure that enables the attachment to be received by the receiving feature of the handheld video gaming device, and that may further serve to couple the attachment to the handheld video gaming device. For example, the attachment may include a flexible structural portion that enables the attachment to be forced from an unflexed form to a flexed form, to receive the handheld video gaming device while the attachment is in the flexed form, and to allow the attachment to return the unflexed form once the handheld video gaming device is received. Additionally, for some embodiments, once the handheld video gaming device is received by the attachment, the attachment is coupled to the handheld video gaming device when the attachment returns to the unflexed form. Depending on the embodiment, the attachment may remain in flexed form only while force is applied, and may return to the unflexed form once force ceases to be applied.

In a number of embodiments, the attachment may comprise a first input mechanism configured to receive an input action from a user and to translate the input action to a corresponding input action to a second input mechanism disposed on the handheld video gaming device. The attachment may comprise a translation mechanism that facilitates this translation of the input action to the first input mechanism to the corresponding input action to the second input mechanism. Depending on the embodiment and the handheld video gaming device, the translation mechanism may be a mechanical mechanism, an electronic mechanism, or some combination thereof.

For instance, where the handheld video gaming device comprises an external electrical interface configured to receive input actions on behalf or in place of input mechanisms of the handheld video gaming device, the attachment may comprise a corresponding electrical interface configured to mate with the external electrical interface of the handheld video gaming device. The attachment may further comprise electronic components that facilitate the electronic translation of an input action to the first input mechanism of the attachment to a corresponding input action to the second input mechanism of the handheld video gaming device.

In another example, the attachment may comprise a lever mechanism configured to mechanically translate an input action (e.g., a lateral movement) to the first input mechanism of the attachment to a corresponding input action (e.g., vertical movement) to the second input mechanism of the handheld video gaming device. For certain embodiments, the translation mechanism of the attachment may comprise a contact element comprising a particular structure or a particular material that enables the input action to the first input mechanism to be mechanically translated to the corresponding input action to the second input mechanism. The structure or material of the contact element may depend on the type of input mechanism utilized as the second input mechanism.

For instance, where the second input mechanism is a capacitive touchpad/trackpad and the first input mechanism is a trigger, the contact element of the translation mechanism may comprise a silicon or metal material (e.g., mounted on a planar surface) configured to come in contact with the capacitive touchpad/trackpad. Then, when such a contact element comes in contact with the touchpad/trackpad or comes within a certain proximity to the touchpad/trackpad (e.g., caused by the trigger being depressed), a capacitive change results in the touchpad/trackpad, where the capacitive change represents an input action to the handheld video gaming device through the touchpad/trackpad.

Consider for example an attachment comprising a trigger disposed on the attachment and a translation mechanism configured to translate an input action to the trigger to a corresponding input action to a touchpad/trackpad (e.g., on the underside of a handheld video gaming device). The translation mechanism may comprise a contact element configured to come in contact with or to come in close proximity to the capacitive touchpad/trackpad when the trigger is depressed. The translation mechanism may further comprise a lever mechanism configured to translate an input action to the trigger as a corresponding movement of the contact element with respect to the touchpad/trackpad Depending on the embodiment, the translation mechanism may be configured to translate a first degree of input to a first input mechanism to a second degree of input to a second input mechanism. For example, a first degree of angular movement in a trigger of the attachment may translate to a second degree of vertical movement of a button on the handheld video gaming device. The translation mechanism may be configured to translate based on a translation ratio between the first degree of input and the second degree of input (e.g., one-to-one, or one-to-two). In this manner, some embodiments are capable of conveying a level or degree of action to an input mechanism of the attachment to a level or degree of action to an input mechanism of the handheld video gaming device.

It should be noted that for some embodiments, the first input mechanism of the attachment may be disposed at a position on the external surface of the attachment that corresponds to the position of the second input mechanism to which it translates. For example, where a first button of the attachment configured to translate a first input action (to itself) to an input action to a second button of the handheld video gaming device, the first button may be disposed at a position on the external surface of the attachment that is directly above the second button of the handheld video gaming device. In some embodiments, the position of the first attachment may be otherwise.

Input mechanisms for the attachment and the handheld video gaming device may include, for example, buttons, switches, directional pads, joysticks, and touchpads/trackpads. A button may be an electronic button, a mechanical button, a trigger, a shoulder button, or a bumper button, a switch may be a rocker switch, a flip switch, or a slide switch, a directional pad may be a round directional pad or a plus-shaped directional pad, a joystick may be a digital or analog joystick, and a touchpad/trackpad may be pressure-sensitive or capacitive touchpad/trackpad.

As noted herein, once the attachment is coupled to the handheld video gaming device, the attachment may cover some or all of the exterior surface or the input mechanisms of the handheld video gaming device. In some embodiments, the attachment may comprise an opening configured such that once the attachment is coupled to the handheld video gaming device, a user may continue to access features of the handheld video gaming device that are disposed on the handheld's device exterior surface.

Consider, for example, a handheld video gaming device having a touchpad/trackpad disposed on an exterior surface of the handheld video gaming device (either on the top side or the underside of the handheld video gaming device). An attachment configured to couple to this handheld video gaming device may comprise an opening or window that allows user access to the touchpad/trackpad even after the attachment is coupled to the handheld video gaming device. Where the attachment is configured to translate an input action of an attachment input mechanism to an input action of the touchpad/trackpad disposed on the handheld video gaming device, the attachment may comprise an opening or window that provides partial access to the touchpad/trackpad, where particular structural features of the attachment cover portions of the touchpad/trackpad in order to facilitate the input action translation.

In some embodiments, the attachment may comprise an opening or a window configured such that once the attachment is coupled to the handheld video gaming device, a user may continue to view the exterior surface of the handheld video gaming device, or hear sounds emanating from the handheld video gaming device. For example, the attachment may comprise an opening or a semi-open surface (e.g., perforated surface) configured such that once the attachment is coupled to the handheld video gaming device, sound emanating from a speaker of the handheld video gaming device can permeate through a surface of the attachment and be heard by the user. In another example, the attachment may comprise a opening or a window configured such that once the attachment is coupled to the handheld video gaming device, a user can continue to view a video screen or an indicator light (e.g., power-on light) disposed on the exterior surface of the handheld video gaming device.

For various embodiments, the attachment may augment the surface of the controller or device to enhance or assist in the controllability of the handheld video gaming device. For instance, to increase a user's fraction of the handheld video gaming coupled to the attachment, suede, elastomer, or a like traction-increasing material may be disposed on the exterior surface of the attachment in order to increase traction between the user's hands and the attachment (thereby enhancing the user's grip of the handheld video gaming device coupled to the attachment). In another example, the attachment may be configured such that the attachment augments the contour of the handheld video gaming device to be better fit in a user's (i.e., a gamer's) hands. For example, an attachment may comprise grip structures that are easier for a user (e.g., gamer) to hold.

Before describing various embodiments of the invention (s) in detail it is useful to describe a few exemplary environments with which the embodiments can be implemented. One such example is that of a computing system, such as a gaming system, used by one or more participants, such as video game players (gamers), to participate in a group activity, such as playing a computer game or video game.

Figure 1:
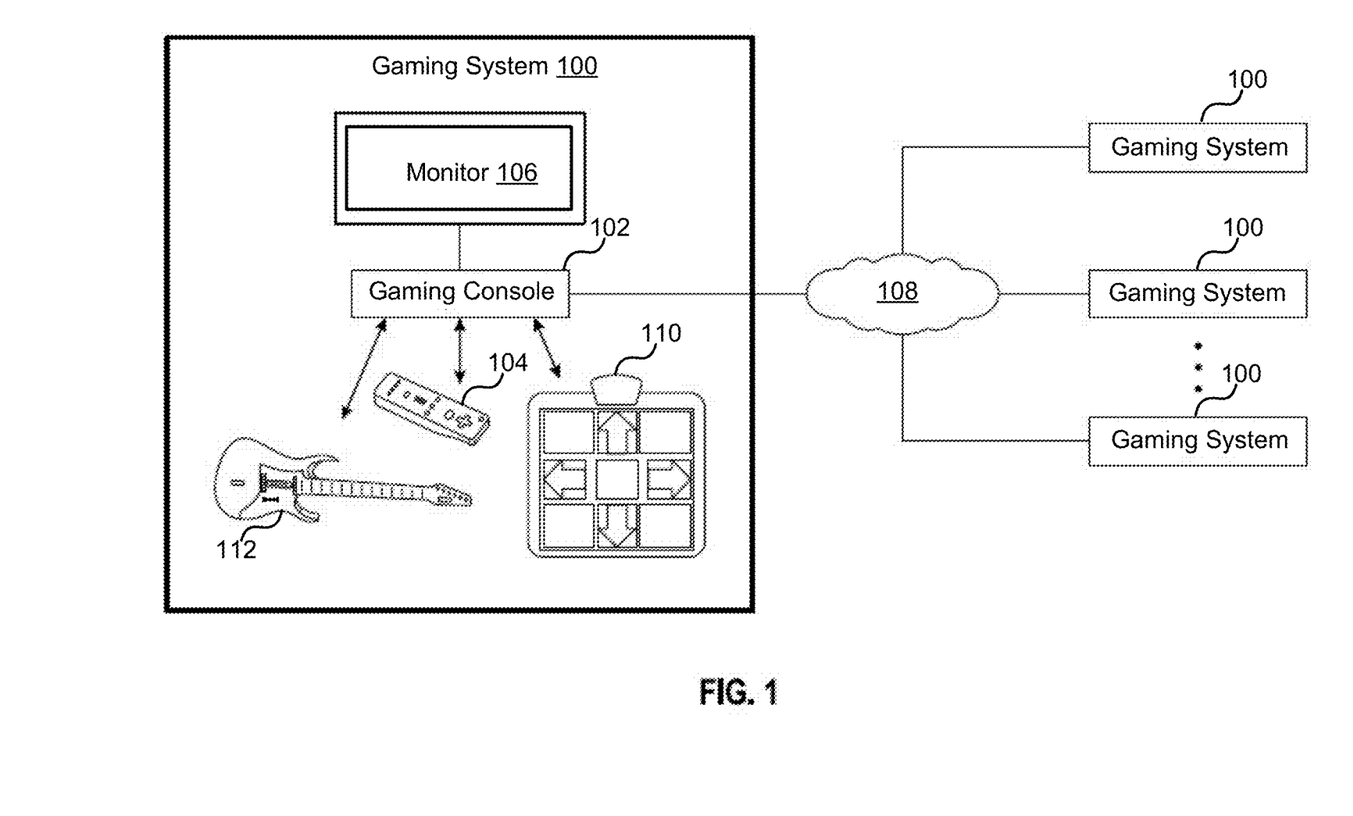
FIG. 1 is a diagram illustrating one example environment in which an embodiment of the invention can be implemented.

FIG. 1 is a block diagram illustrating a generalized version of a gaming system 100 as one example of an environment with which embodiments can be implemented. Referring now to FIG. 1, the example gaming system includes a gaming console 102, a monitor 106, a dance pad game controller 110, and a musical-instrument game controller 112. Both dance pad game controller 110 and musical-instrument game controller 112 are in this example in addition to traditional game controller 104. The illustrated example also includes an interface to a communication medium or communication network 108 such as, for example, the Internet or other communication channel.

In one environment, gaming console 102 might be implemented as a PlayStation®, Xbox360®, Wii™ or other like gaming console. In another implementation, gaming console 102 might be implemented as a personal computer or other like computing device. A gaming console 102 would typically include a processor or other computing device providing the ability to allow gaming applications, which are typically software applications, to be run thereon. A gaming application might be installed, for example, through the use of CD ROM drives, DVD drives, or other storage medium or communications interfaces. Typically, a gaming console 102 can be analogized to a computer or computing system to run the gaming software. In another environment, the gaming console 102 might be implemented as a personal computer.

A monitor 106 is typically provided to allow the gaming environment to be displayed to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, and other signal types or specifications can be used to provide communications between gaming console 102 and monitor 106. In the alternative, a video projector or other viewing mechanism (not shown) can be utilized in place of the monitor 106 to provide similarity display functionality.

As illustrated, speakers can also be provided, separately or with monitor 106, to provide audible information to the gamer during game play and during set up. For example, in one embodiment, monitor 106 might be implemented as a television with built in speakers that is connected to the gaming console via a coaxial or other audio and video input.

Also illustrated in the exemplary environment is gaming controller 104 that can be used to allow gamers to provide input to the game software as well as to receive feedback from the game software during set up and game play. As described in the background section, controller 104 can include, for example, X, Y, A, B buttons, triggers, analog joysticks, key pads, and other devices to allow the user to provide input to the game. Thus by actuating the various buttons, switches or joysticks, the gamer can control the operation of the game or control characters or vehicles in the game. The interface between gaming console 102 and controller 104, dance pad game controller 110, and musical-instrument game controller 112 might be either wired and/or wireless interfaces as may be desired. Likewise, throughout this document, references to communication or signal interfaces can be implemented using wired or wireless interfaces, unless otherwise specified.

Also illustrated in the example of FIG. 1 is a communications connection to a network 108. For example, a user may wish to connect the gaming console 102 to the internet or other communication medium whereby game information can be downloaded or uploaded to various websites, online services such as Xbox Live™, or other entities or services. Also, through a communication medium 108, gamers might compete amongst other gamers at their gaming systems 100, even if such other gamers at remote or distant locations. Note that depending on the gaming environment, remote gaming systems 100 might or might not have similar configurations to one another.

Although not depicted, game system 100 can have feedback devices, or stimulus, that can be used to provide sensory feedback from the gaming console to the user. The game system 100 can also have biosensors allowing for bioinformation (e.g., biometrics) regarding the user to provided to the console. Both the biosensors and feedback devices can communicate to the gaming console 102 via a separate communication path from the controllers 104, 110, and 112. For example, feedback devices can communicate through the USB ports or like communication ports as those found on gaming consoles such as the XBOX 360®, PlayStation® and personal computing system. Biosensors and feedback devices can also be configured to connect through ports of handheld gaming consoles 102, often referred to as expansion ports. As a further example, biosensors and feedback devices can communicate with gaming consoles 102 via wireless communication interfaces.

In yet another embodiment, feedback devices and biosensors can communicate with the gaming console via a communication path through the gaming controller 104. For example, the communication controller can be equipped with another communication interface and the biosensors, feedback devices, or both are communicatively coupled (whether hard wired or wirelessly) to the gaming controller 104. As one specific example of this case, a biosensor and feedback device can be configured for communicative coupling to a Wii controller via the Wii controller's Wii Nunchuck pass-through port. As these examples serve to illustrate, there are a number of mechanisms by which a biosensor or feedback device can be interfaced to a controller or to the gaming console.

Those of ordinary skill in the art will appreciate that various embodiments described herein may be used in conjunction with video game controllers, such as gaming controllers 104, 110, and 112, and with handheld video gaming device that share features similar to those of the game system 100 and its various devices (e.g., gaming controller 104).

Figure 2:
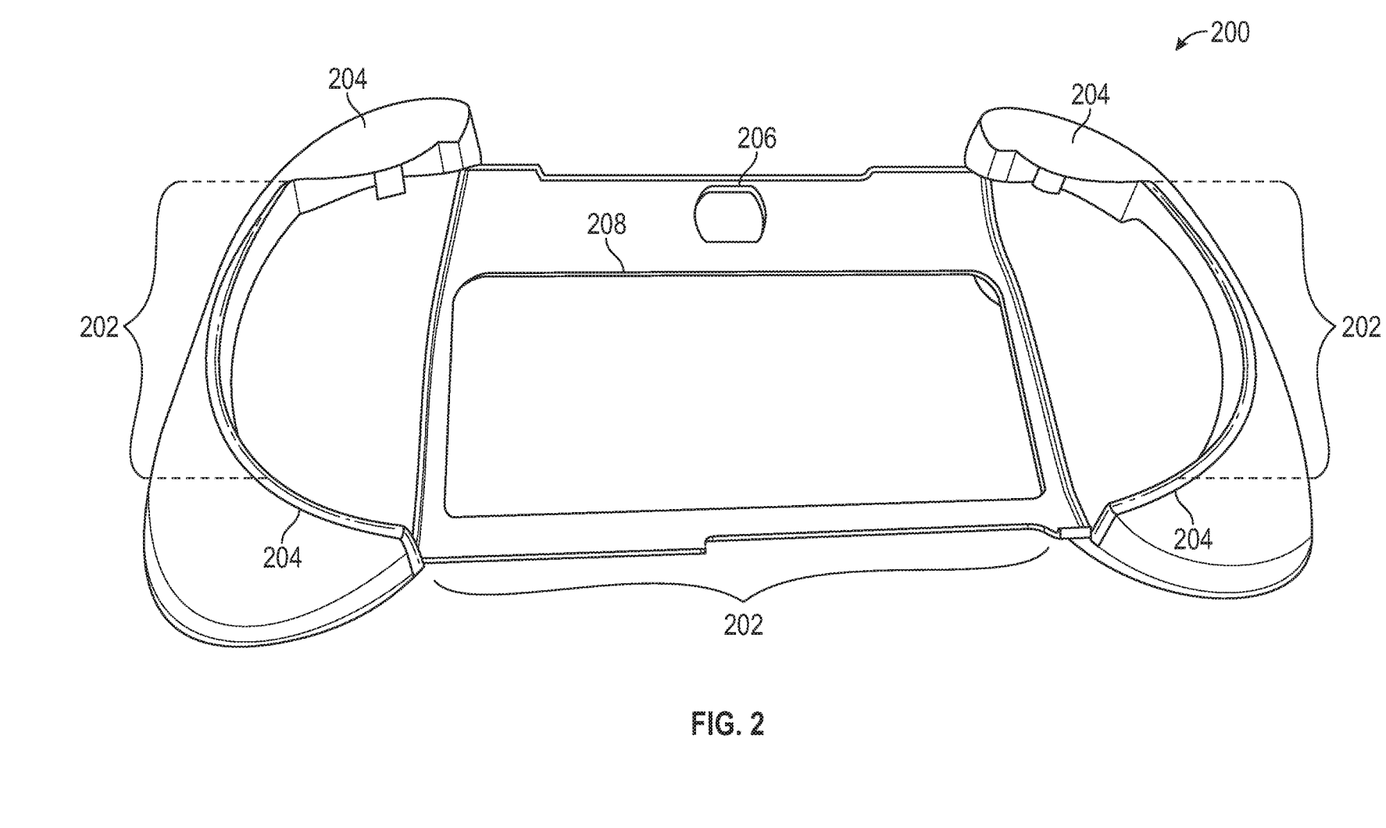
FIG. 2 is depicts a top view of an exemplary attachment in accordance with one embodiment.
Figure 3:
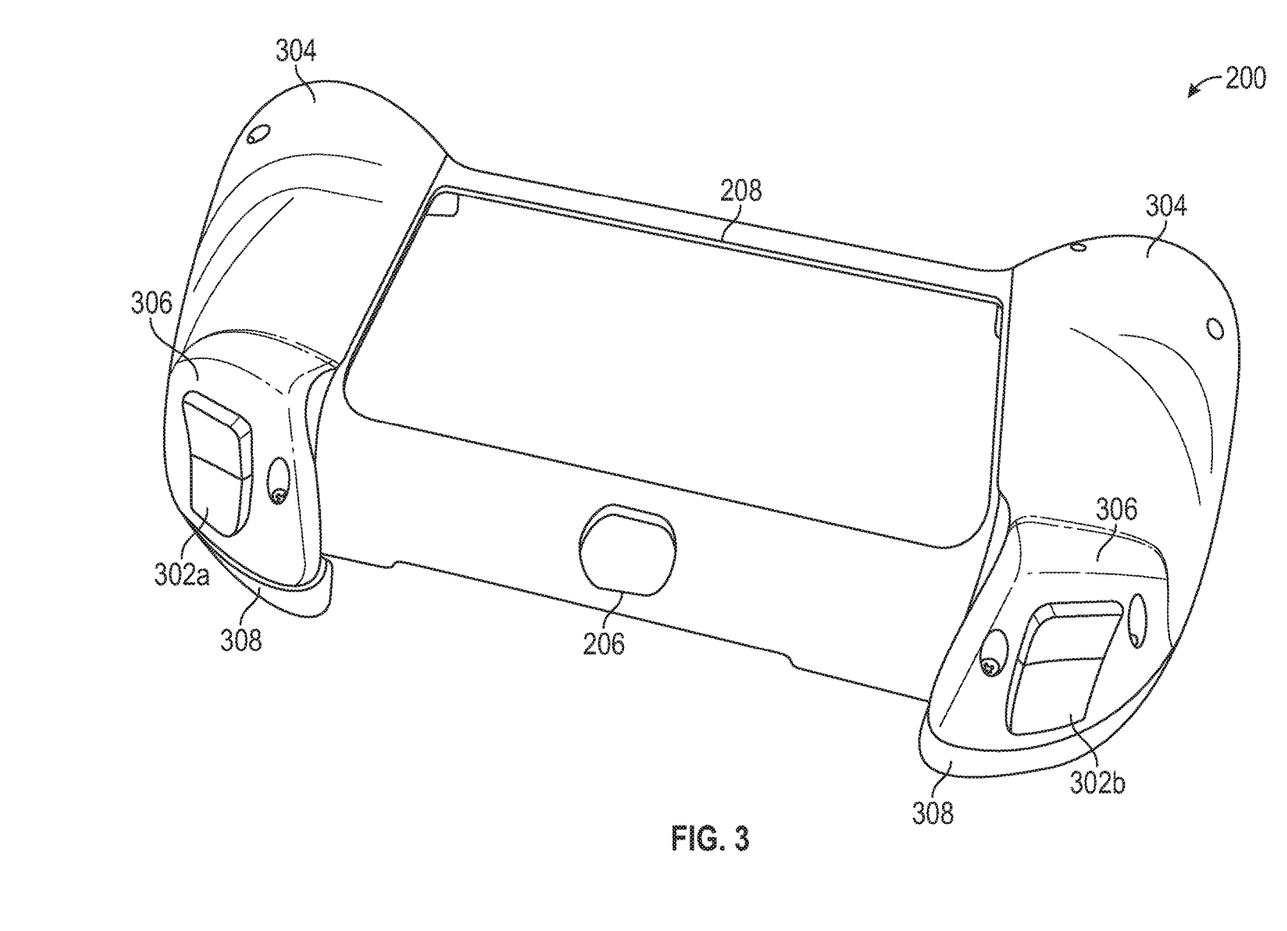
FIG. 3 is depicts a bottom view of an exemplary attachment in accordance with one embodiment.

FIG. 2 depicts a top view of an exemplary attachment 20 in accordance with one embodiment, and FIG. 3 depicts a bottom view of the same exemplary attachment 200. The exemplary attachment 200 comprises a recess 202 configured to receive a handheld video gaming device, such a Sony® Playstation® Vita, and structural features 204 that retain the handheld video gaming device once placed in the recess 202, thereby coupling the attachment 200 to the handheld video gaming device. As noted herein, the attachment 200 may be structurally flexible or semi-flexible, thereby allowing the attachment to be temporarily flexed (e.g., twisted or bent) as the handheld video gaming device is inserted into the recess of the attachment.

As shown in FIGS. 2 and 3, the attachment 200 comprises multiple openings or carve-outs 206, 208 at bottoms sections of the attachment 200. The openings 206, 208 may provide unrestricted or semi-restricted access to the bottom of the handheld video gaming device once the handheld video gaming device is coupled to the attachment 200. For example, were the exemplary attachment 200 to be coupled to a Sony® Playstation® Vita, through the opening 208 of the attachment, a user could access the capacitive touchpad/trackpad located on the underside of the Sony® Playstation® Vita. Though not depicted, in some embodiments, the large opening shown may comprise further structural features that may restrict access to the underside of the handheld video gaming device, where the structural features facilitate translation between a first input mechanism of the attachment and a second input mechanism of the handheld video gaming device. The smaller opening 206 may be configured such that once the handheld video gaming device is coupled to the attachment, a user may access a button on the underside of the handheld video gaming device.

Like the openings 206, 208, the carve-outs may be configured such that once the handheld video gaming device is coupled to the attachment 200, a user (e.g., gamer) can access (physical, visually, or audibly) portions of the exterior surface of the handheld video gaming device to which the attachment 200 is coupled. For example, certain carve-outs may allow a user to hear sounds emanating from a speaker that is disposed on or that is close to the exterior surface, may provide a vent on the exterior surface of the handheld video gaming device access to the ambient air (e.g., for device cooling purposes), or may provide access to certain input mechanisms of the handheld video gaming device that may not be associated with any of the input mechanisms of the attachment (i.e., not subject to translation by the attachment).

As depicted in FIG. 3, the attachment comprises a left trigger 302a, a right trigger 302b, and structural features 304, 306, 308 that would augment the contour of a handheld video gaming device once coupled to the attachment 200. The structural features 304, 306, 308 may comprise a contour that conforms to the grip of a user (e.g., a gamer). The left and right triggers 302a, 302b are disposed on the exterior surface of the attachment 200 such that the triggers are easily accessible to a user's trigger fingers as the user holds the attachment 200. As noted herein, the attachment 200 may comprise a translation mechanism that translates an input action to the left trigger 302a or the right trigger 302b to a corresponding input action to the handheld video gaming device coupled to the attachment 200. For example, the translation mechanism may configured such that once the handheld video gaming device is coupled to the attachment 200, an input action to the left trigger 302a would translate to an input action to a left shoulder/bumper button of the handheld video gaming device, and an input action to the right trigger 302b would translate to an input action to a right shoulder/bumper button of the handheld video gaming device.

Alternatively, the translation mechanism may be configured such that an input action to the left trigger 302a would translate to an input action to a certain section (e.g., upper left corner) of a touchpad/trackpad disposed on the underside of the handheld video gaming device and, similarly, an input action to the right trigger 302b would translate to an input action to a another section (e.g., upper right corner) of the touchpad/trackpad. The translation mechanism may comprise a contact element (e.g., silicon flat element) configured to come in contact with, or come in close proximity to, the touchpad/trackpad when an input action is made to an input mechanism of the attachment (e.g., input action to a left trigger or a right trigger).

Figure 4:
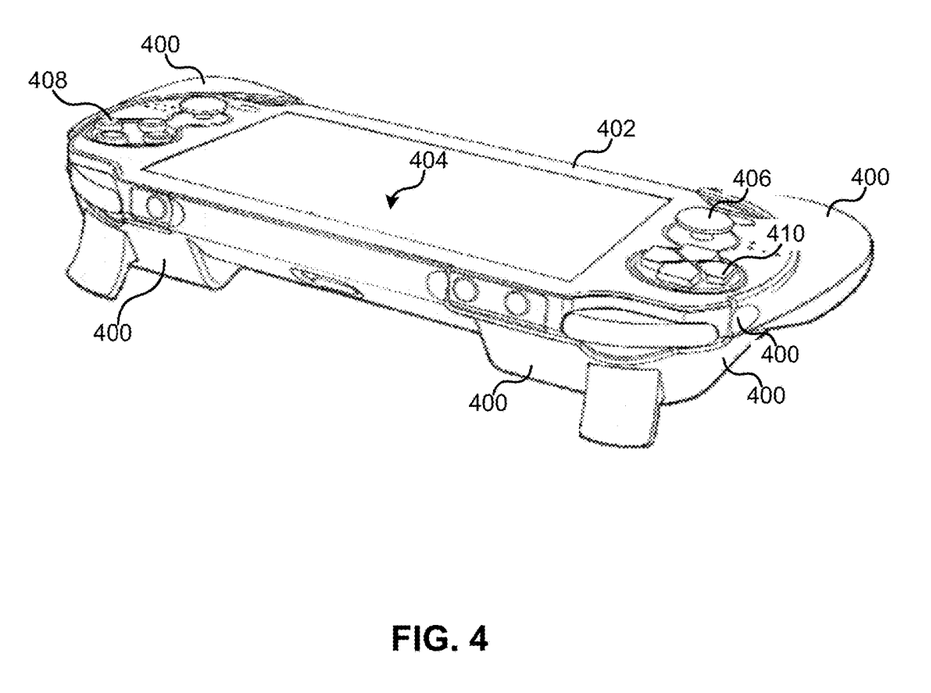
FIG. 4 depicts an exemplary attachment coupled to an handheld input device in accordance with one embodiment.

FIG. 4 depicts an exemplary attachment 400 coupled to a handheld video gaming console 402 in accordance with one embodiment. As shown in FIG. 4, the recess of the exemplary attachment 400 may be configured such that once the handheld video gaming console 402 is coupled to the attachment 400, a user is able to view the screen 404 of the handheld video gaming console, and access the joysticks 406, action buttons 408, and directional pad 410, all of which are disposed on the top side of the handheld video gaming console 402 and along the edge of the handheld video gaming console. As also shown, disposed on the exterior of the exemplary attachment 400 are left trigger 414a and right trigger 414b, each of which may be configured to translate an input action received from a user to a corresponding input action with respect to an input mechanism of the handheld video gaming console 400. The input mechanism receiving the corresponding input action may be disposed on the exterior of the handheld gaming console 400, which as discussed herein, may be wholly or partially covered by the attachment 400 once coupled to the handheld video gaming console 400.

Figure 5:
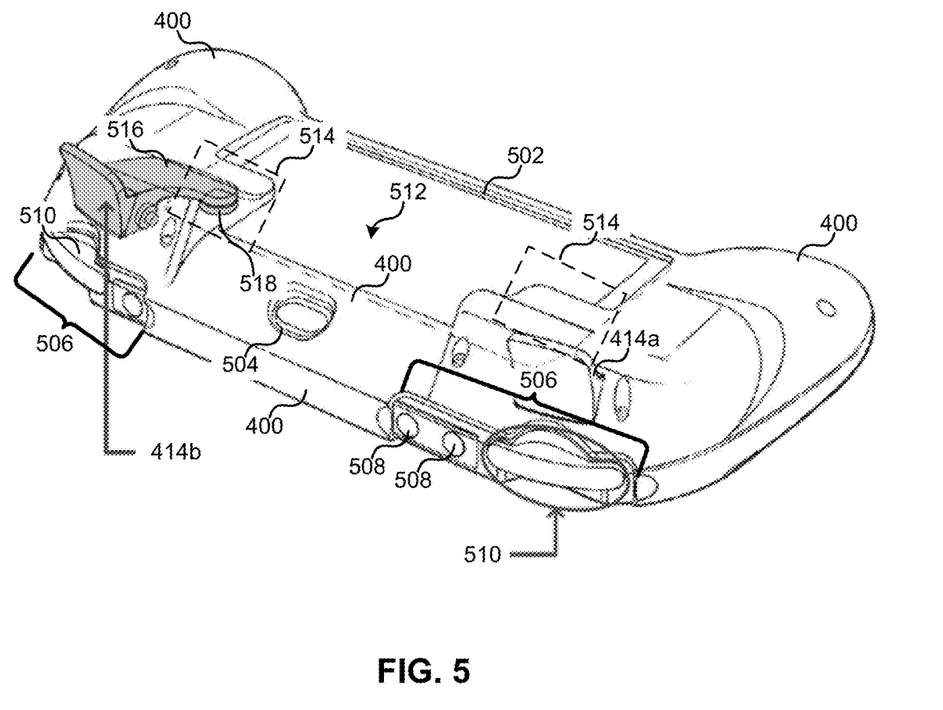
FIG. 5 depicts a bottom perspective view of an exemplary attachment coupled to an handheld video gaming console in accordance with one embodiment.
Figure 6:
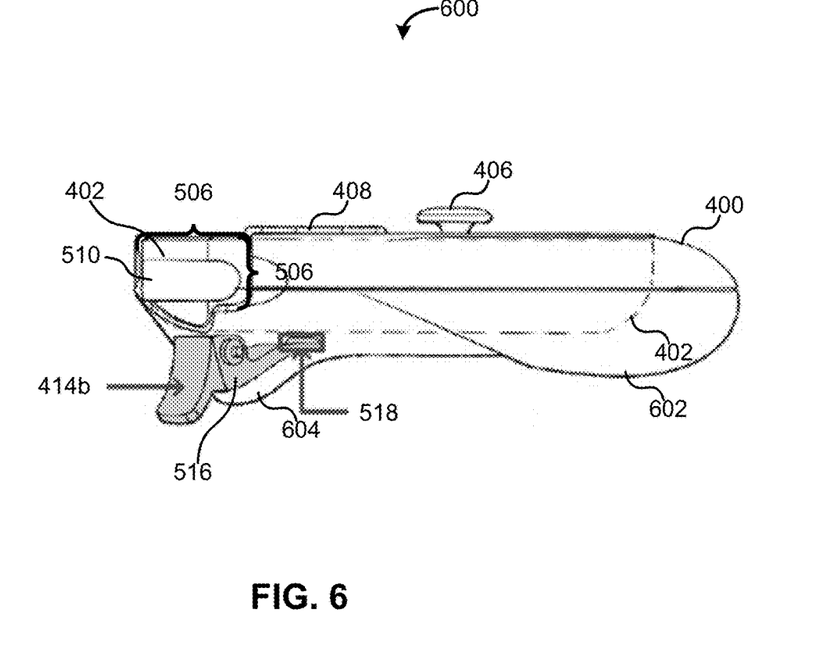
FIG. 6 depicts a bottom perspective view of an exemplary attachment coupled to an handheld video gaming console in accordance with one embodiment.

FIG. 5 depicts a bottom perspective view of an exemplary attachment 400 in accordance with one embodiment used in conjunction with the handheld video gaming console 402, and FIG. 6 depicts a side profile view of the same exemplary attachment 400 used in conjunction with the handheld video gaming console 402. The handheld video gaming console may be a Sony® Playstation® Vita, or some other handheld video gaming device that properly couples with the attachment.

As shown in FIG. 5, the exemplary attachment 400 comprises carve-outs 502, 504, 506 for portions of the exemplary attachment 400 (i.e., opening in the exemplary attachment), where the portions correspond to inputs (e.g., buttons) disposed on the handheld video gaming console and allow a user (e.g., gamer) to access the inputs. For instance, where the inputs disposed along the edge of the handheld video gaming device (e.g., volume buttons 508, shoulder/bumper buttons 510), carve-outs 506 for portions of the attachment may correspond with the inputs disposed along the edge of the handheld video gaming device.

FIG. 5 also shows the attachment as comprising a large opening 502 on bottom side of the attachment 400. As noted herein, the large opening 502 may provide access to the touchpad/trackpad 512 located on the underside of the handheld video gaming console. In FIG. 5, the large opening 502 is shown with structural features 514 that partially restrict access to the touchpad/trackpad 512 of the handheld video gaming console, specifically, to two adjacent corners of the touchpad/trackpad 512. Depending on the video game title being played on the handheld video gaming device, an input action to each of the corners of the touchpad/trackpad 512 may be interpreted differently by the video game title. For example, for a video game title that is a first-person-shooter, the video game title may interpret a tap to one corner of the touchpad/trackpad 512 to be a right trigger action to be a first weapon fire command, and a tap to another corner of the touchpad/trackpad 512 to be a second weapon fire command (e.g., the tap may be by way of physical pressure or contact by capacitive change).

As briefly described herein, a tap to the touchpad/trackpad 512 may be caused by a translation mechanism coupled to an input mechanism of the attachment (e.g., a trigger 414b disposed on the exterior surface of the attachment), where the translation mechanism is configured to translate an input action to the input mechanism as a tap to the touchpad/trackpad 512 of the handheld video gaming console. For some embodiments, the translation mechanism may be similar to the capacitive lever 516 depicted in FIG. 5, comprising a trigger surface of trigger 414b configured to receive action from a user's finger (e.g., gamer's finger) and a lever mechanism configured to translate the action of the trigger surface to movement of material 518 that comes in contact with the touchpad/trackpad 512.

FIG. 6 depicts the contour of a structural features 602, 604 of the attachment configured to conform the grip of a user's hands (e.g., a gamer's hands), thereby enhancing the user's grip of the attachment 400 and the handheld video gaming console 402 to which the attachment 400 is coupled. FIG. 6 also depicts the capacitive lever 516 described with respect to FIG. 5, and capacitive silicon, which functions as the material 518 that comes in contact with the touchpad/trackpad of the handheld video gaming console (also referred to herein as "contact material"). For some embodiments, when the capacitive silicon comes in contact with the touchpad/trackpad 512, it may cause a capacitive change in the touchpad/trackpad that the handheld video gaming console translates as a user input. The capacitive silicon may be shaped and/or disposed on the capacitive lever 516 such that when the capacitive silicon comes in contact with the touchpad/trackpad 512, it does in such a manner that the touchpad/trackpad 512 translates the contact as a specific input to the handheld video gaming console.

For example, the capacitive silicon may be shaped and/or disposed on the capacitive lever 516 such that when the capacitive silicone comes in contact with the touchpad/trackpad, the contact is translated as a first command, such as firing a first weapon. Those skilled in the art will appreciate that the attachment 400 may comprise another translation mechanism (e.g., another capacitive lever) including a material configured to come in contact with the same touchpad/trackpad 512 but in a manner (e.g., at a different location of the touchpad/trackpad) that causes the touchpad/trackpad 512 to translate the contact as a second command different from the first command (e.g., fire a second weapon or a jump action).

'While various embodiments have been described above with respect to handheld video gaming device, it should be understood that they have been presented by way of example only, and not of limitation. Those of ordinary skill in the art would appreciate that some embodiments may be utilized with other handheld devices comprising input mechanisms.

Likewise, the various diagrams may depict an example architectural or other configuration for the invention(s), which is done to aid in understanding the features and functionality that can be included in the invention(s). The embodiments of the invention(s) are not restricted to the illustrated exemplary architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention(s). Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although embodiments of the invention(s) are described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention(s), whether or not such embodiments are described and whether or not such features are presented as being a part of a described embodiment. Thus, the breadth and scope of the present invention(s) should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

What is claimed is:

1. An attachment, comprising:
    a structure configured to attach to an input device having a touch-sensitive input mechanism, the structure comprising:
        a receiving feature configured to receive the input device for attachment;
        a coupling mechanism configured to secure the input device while the input device is disposed in the receiving feature; and
        an input mechanism of the attachment configured to receive an input action from a user and translate the input action to a corresponding input action to the touch-sensitive input mechanism of the input device;
        wherein the input device has a topside and an underside and the touch-sensitive input mechanism is disposed on the underside of the input device;
        wherein the input mechanism comprises a contact element configured to come in contact with the touch-sensitive input mechanism when the input action is translated to the corresponding input action.

2. The attachment of claim 1, wherein the touch-sensitive input mechanism is a capacitive touchpad.

3. The attachment of claim 1, wherein the contact element comprises capacitive silicon.

4. The attachment of claim 1, wherein the input mechanism comprises a contact element configured to come in proximity to the touch-sensitive input mechanism when the input action is translated to the corresponding input action.

5. The attachment of claim 1, wherein the input mechanism translates the input action to a corresponding input action by a lever mechanism.

6. The attachment of claim 1, wherein the input device is a handheld video game system.

7. The attachment of claim 1, wherein the input device is a handheld video game controller.

8. The attachment of claim 1, wherein the input mechanism is a trigger.

9. The attachment of claim 1, wherein the structure is configured to be temporarily flexed as the input device is inserted into the receiving feature.

10. The attachment of claim 1, wherein the receiving feature comprises an opening or a recess configured to receive a body of the input device.

11. The attachment of claim 10, wherein the receiving feature corresponds to a contour of the body of the input device.

12. The attachment of claim 1, wherein the attachment comprises a carve-out corresponding to an input of the input device, a speaker of the input device, or a vent of the input device.

13. The attachment of claim 9, wherein the receiving feature comprises an opening or a recess configured to receive a body of the input device.

14. The attachment of claim 12, wherein the receiving feature comprises an opening or a recess configured to receive a body of the input device.

15. The attachment of claim 12, wherein the attachment comprises a plurality of carve-outs corresponding to a plurality of inputs of the input device.

16. The attachment of claim 11, wherein the attachment comprises a carve-out corresponding to an input of the input device, a speaker of the input device, or a vent of the input device.

17. The attachment of claim 1, wherein the touch-sensitive input mechanism is a touchpad or trackpad.

18. The attachment of claim 17, wherein the touch-sensitive input mechanism is a capacitive touchpad or trackpad.

* * * * *